P. HIEN.
DEMOUNTABLE RIM.
APPLICATION FILED JAN. 7, 1918.
1,410,179.
Patented Mar. 21, 1922.
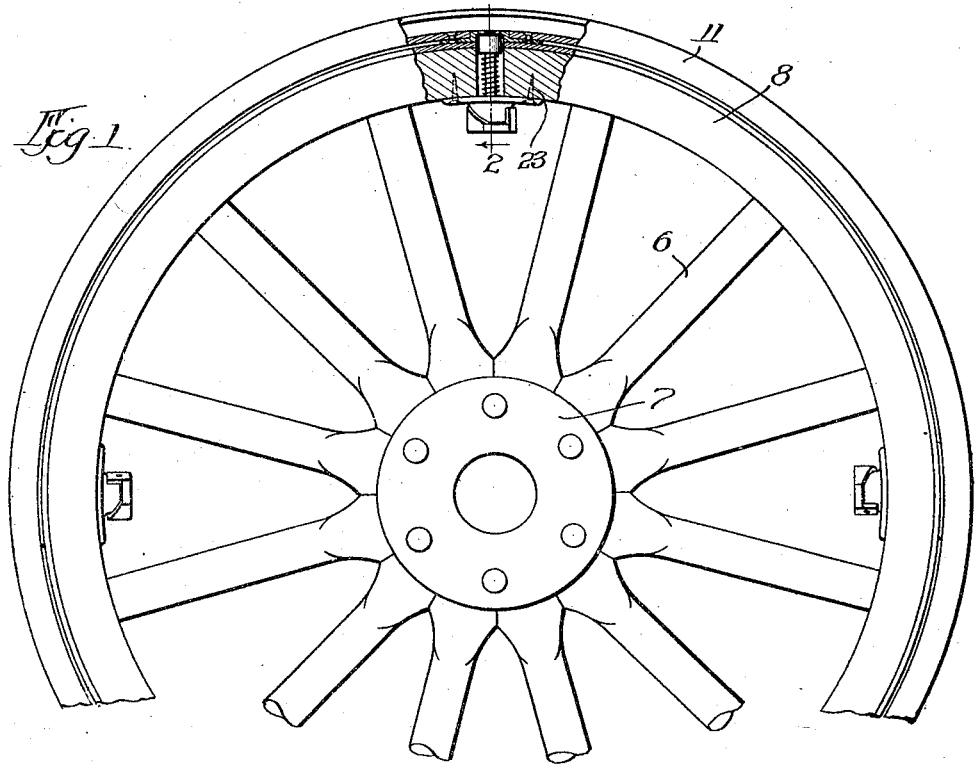
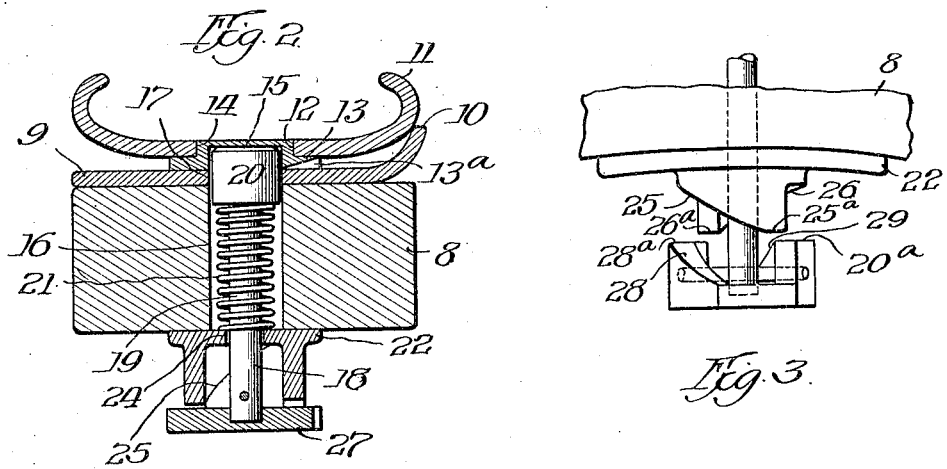
Witnesses:
Inventor
Phillip Hien,
by Wilkinson & Huxley
attys.

UNITED STATES PATENT OFFICE.

PHILLIP HIEN, OF CHICAGO, ILLINOIS.

DEMOUNTABLE RIM.

1,410,179.  Specification of Letters Patent.  Patented Mar. 21, 1922.

Application filed January 7, 1918. Serial No. 210,665.

*To all whom it may concern:*

Be it known that I, PHILLIP HIEN, a citizen of the United States, residing at Chicago, in the county of Cook and State of Illinois, have invented certain new and useful Improvements in Demountable Rims, of which the following is a specification.

My invention relates to vehicle wheels and particularly to demountable rims for motor vehicles.

One of the objects of my invention is to provide a simple and efficient means for removably securing demountable rims to wheels.

Another object is to provide a means for removably securing demountable rims to vehicle wheels which is positive in operation and which does not unduly subject the rims to wedging strains.

A further object is to provide a means for removably securing demountable rims to vehicle wheels which when applied will prevent lateral or circumferential movement of the rims relative to the wheels.

A still further object is to provide means for removably securing demountable rims to vehicle wheels having no parts to become detached and lost while changing rims.

A yet further object is to improve demountable rim construction and application for successful commercial use.

Since the widespread use of demountable rims for use in connection with motor vehicles, many and various means have been devised for removably securing the rims to the wheels. Many of these devices comprise removable parts which when rims are being changed on wheels become lost or misplaced or often times damaged to such an extent as to be unfit for further use.

My invention seeks to overcome the above recited objections by providing a plurality of plungers radially mounted in the felly of the wheel and normally maintained outwardly of the felly preferably by spring pressure. The inner ends of the plungers are provided with novel heads having cam surfaces which when turned will retract the plungers, all of the various parts being self contained and having no part to be removed when it is found desirable to change the rims so as to eliminate the possibility of loss of some of the parts and remove all likelihood of damage.

My invention will be more fully described and pointed out in the following description in connection with which reference is made to the drawings, wherein;

Figure 1 is a side elevation of a wheel having applied thereto a demountable rim, embodying the preferred form of my invention, a portion of the wheel being cut away to show the cooperative elements.

Figure 2 is a section on line 2—2 of Figure 1; and

Figure 3 is an elevation of the preferred form of head and cam for moving the plungers out of operative engagement with the rim.

5 designates a motor vehicle wheel having the usual spokes 6 and hub 7. 8 is the usual felly and in the form shown is oblong or rectangular in section. Mounted on the outer portion of the felly is a permanent rim 9 having its inner edge out-turned forming a flange 10 which extends around the inner portion of the felly forming a shoulder or abutment for limiting the inward movement of the demountable rim 11 on the wheel.

In the form which I have chosen to illustrate my invention the surface of the permanent rim 9 is parallel to the axial line of the wheel. In some forms of demountable rims the permanent rim is inclined to afford easy application of the demountable rim. The demountable rim 11 is provided at intervals with apertures 12 extending through the rim body. Secured to the under side of the rim 11 are a series of spacers 13 which spacers are provided with bosses 14 for extending into the apertures 12 of the rim, and interfitting therewith. The spacers 13 are securely fastened to the rim by rivets, welding, or in any other suitable manner. The under sides of the spacers 13 are counterbored forming recesses 15 which I prefer to extend into the boss 14 for reasons which will hereinafter be more fully set out. The felly 8 and the permanent rim 9 are provided with a series of registering apertures 16, 17. Mounted therein are the plungers 18 which in the preferred form of my invention comprise a reduced member or stem 19, and head 20 in shape and size substantially that of the counterbore 15 in the spacers 13. Surrounding the stem 19 is a coil spring 21 normally acting to move the head 20 outwardly. The plungers are maintained in operative position in the felly by being mounted in a casing 22 which is secured to the felly in any well known manner such as by screws 23. The casing is provided with an aperture 24 through which the lower portion of the stem 19 passes. Integrally formed with the casing 22 are cam surfaces 25, 26, correspondingly shaped. The lower end of the stem 19 carries a head 27 having formed thereon upwardly extending cam surfaces 28, 29, for engagement with cams 25, 26, on member 22. The stem 19 and the head 27 are positively connected so that when the head 27 is turned by hand or wrench, the stem 19 will be moved therewith because of the cooperation between the cams. The ends of the cam surfaces are provided with flattened portions 25ª, 26ª, 28ª, 29ª, for the purpose of retaining the plungers in withdrawn position, when the flattened portions of the cams are brought into engagement.

As is usual, demountable rims are moved laterally onto and off of the vehicle wheel. To permit ease of removal and application it is necessary that sufficient play be provided for between the permanent rim and the demountable rim. I have provided for this by using spacers 13 so that it is unnecessary to make the permanent rim 9 inclined as is usually done. The inner portions of the spacers 13 are provided with inclined faces 13ª so as to force the plungers 18 inwardly as the rim is being applied if the plungers should be in an outward position.

One of the objections to the use of demountable rims has been the lateral as well as circumferential movement of the rim with respect to the wheel. As a result of such movement squeaking often occurs whenever sand or the like enters between the rim and the felly, also relative movement is likely to bend or shear the valve stem which passes through the felly and is connected with the inner tube of the tire on the rim. Furthermore, if any play is permitted between the rim and the wheel then the various parts connecting the rim and the wheel are subjected to undue strain when the vehicle is in motion, all of which tends to be detrimental rather than beneficial. To overcome lateral and circumferential movement of the wheel I have provided the spacers 13 with the bosses 14 extending through the rim 11 and by forming the counterbore 15 with a sufficient depth to permit the head of the plunger to enter beyond the inner surface of the rim, I transfer the driving strains directly to the rim and not to the rim through the medium of wedges or spacers fastened thereto. If the plunger head 20 extended through the spacers 13 only and not beyond the inner surfaces of the rim 11 the tendency would eventually be to shear off the spacers from the rim. By providing the spacers with the bosses 14 I overcome this objection and have provided a most positive connection between the rim and the wheel. Furthermore, the fit between the head 20 and the counterbore 15 is such as at all times to hold the rim 11 against the shoulder or flange 10, thus preventing the lateral movement of the rim 11. The same fit prevents circumferential movement of the rim on the wheel. By making the head 20 of sufficient size to engage tightly the upper portion of the aperture 16 in the felly 8 and pass through the aperture 17, in the permanent rim 9 and through the counterbore 15 of the spacers 13 there is no tendency whatsoever to permit any sort of play as regards the head of the plunger and consequently, the rim on the wheel. If desired, the upper end of the head 20 may be chamfered as at 20ᵉ which will tend to seat the rim 11 securely in position on the wheel as the head 20 is forced in the counterbores 15 by the action of the spring 21 if the rim should not be centered properly.

The operation of the device is as follows:

The rim being applied to the wheel as shown in Figures 1 and 2, it is desired to remove the rim from the wheel. To accomplish this heads 27 are turned either by hand or by tool if found necessary which turning will, by virtue of the cams 25, 26, 28 and 29 cause the heads 27 to ride on the cams 25, 26 thereby causing the plungers 18 to move inwardly with respect to the felly and withdraw the heads 20 from engagement with the counterbores 15 in the rim and spacers. When all of the plungers 18 have been withdrawn and held in withdrawn position by turning the flattened portions 25ª, 26ª, 28ª, 29ª, into engagement the rim 11 may be removed in the usual manner. It will be observed that there is no obstruction of any sort to the removal of the rim when the plungers are withdrawn as above described. To replace the same or another rim on the wheel, the plungers being in retracted position the rim is applied, the usual valve stem being inserted in the aperture (not shown) in the felly provided for that purpose. The rim is then moved against the shoulder 10. The heads 27 on the plunger 18 are then turned only so far as to disengage the flattened faces 25ª, 26ª, 28ª, 29ª, and the springs 21 will cause the plungers to be moved into engagement with the counterbores 15 on the inner portion of the rim. It will be observed that the movement of the plungers to seat the rim on the wheel is practically automatic, due to the action of the springs 21 when the heads 27 are released from withholding position. The tension of the springs 21 may be varied to meet the various conditions of service. It is of course, understood that heavier rims will require heavier springs and lighter rims lighter springs. It will be observed that the load of the vehicle is transferred directly to the mid position of the wheel through the spacers 13 and directly through the axial line of the spokes, in the case of a wooden wheel. The abutment between the rim 11 and the shoulder 10 tends to steady the rim on the wheel, also limits the inward position of the rim. It is, of course, understood that rim 11 carries the usual tire, the form shown being that adapted for a clincher tire. It is understood that a demountable rim may be adapted to take any kind of a tire, clincher, Q. D., straight side or any other standard make as the shape of the rim and kind of tire used thereon does not form a part of my invention.

It is obvious that modifications of such a device may be made and the modifications of which such a device are susceptible I consider as coming within the scope of my invention as embodied in the appended claims.

I claim:

1. A demountable tire rim fastening device, including in combination with a wheel, a rim, a shouldered block interfitting with an opening in the rim and having a socket therein extending beyond the inner or concave surface of the rim, a spring-actuated plunger mounted in the wheel felloe for radial movement therein and having a head adapted to enter the socket in said block, the other end of the plunger carrying a cam for engaging a cam surface on the felloe, said cams having flattened portions whereby to retain said plunger out of engagement with the rim under certain conditions.

2. A demountable rim attaching arrangement, including, in combination with a wheel, a rim having a block attached to the concave side thereof, said block having a socket therein, a spring-pressed plunger carried in the wheel felloe and radially movable therethrough for engaging said socket under certain conditions, the block having an inclined slot extending from the inner edge of the block to the socket whereby said plunger may be moved inwardly of the wheel to permit application thereto of the rim.

3. In combination with a vehicle wheel, a tire rim removably surrounding the wheel felloe, a plurality of spaced blocks having sockets formed therein and secured to the tire rim projecting inwardly of the inner surface thereof, each of said blocks having an inclined counter bore portion forming a socket therein extending from the inner end of the block to the inner surface of the tire rim, radially movable plungers mounted in the wheel felloe and spaced to align with the sockets in said blocks, and means for radially moving said plungers into and out of engagement with the sockets in the respective blocks, said plungers being guided by the cut-away portions of the blocks into alignment with said sockets.

4. A demountable tire rim fastening device, including, in combination with a wheel, a shouldered block interfitting with an opening in the rim, said block having a socket therein extending beyond the inner or concave surface of the rim, a spring-actuated plunger mounted in the wheel felloe for radial movement and having a head adapted to enter the socket in said block, the other end of the plunger carrying a cam for engaging another cam on the felloe, said cams having flattened portions whereby to retain said plunger inwardly of the felloe band clear of the rim when said flattened surfaces of the cams are in contact.

5. A demountable rim attaching arrangement, including, with a wheel, a rim, said rim having a block attached to the concave side thereof, which block is provided with a socket therein, a spring-pressed plunger carried in the wheel felloe and radially movable therethrough, the block having an inclined slot extending from the rear edge of the block to the socket, whereby said rim may be guided in its application to the wheel by engagement between the slot and the plunger.

Signed at Chicago, State of Illinois, this 21st day of December, A. D., 1917.

PHILLIP HIEN.